(12) United States Patent
Györgyi et al.

(10) Patent No.: US 12,325,133 B2
(45) Date of Patent: Jun. 10, 2025

(54) IN-NETWORK CONTROL OF ACTUATORS FOR ROBOTIC ARMS

(71) Applicant: Telefonaktiebolaget LM Ericsson (publ), Stockholm (SE)

(72) Inventors: Csaba Györgyi, Nyiregyhaza (HU); Gergely Pongrácz, Budapest (HU); Geza Szabo, Kecskemet (HU); Sándor Laki, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 273 days.

(21) Appl. No.: 17/926,364

(22) PCT Filed: May 27, 2020

(86) PCT No.: PCT/IB2020/055048
§ 371 (c)(1),
(2) Date: Nov. 18, 2022

(87) PCT Pub. No.: WO2021/240219
PCT Pub. Date: Dec. 2, 2021

(65) Prior Publication Data
US 2023/0321829 A1  Oct. 12, 2023

(51) Int. Cl.
*B25J 9/16* (2006.01)
(52) U.S. Cl.
CPC ............. *B25J 9/1664* (2013.01); *B25J 9/161* (2013.01)
(58) Field of Classification Search
CPC ............. B25J 9/1664; B25J 9/161; G05B 2219/33221; G05B 2219/33251; G05B 2219/40174; G05B 2219/40176; G05B 19/4186; G05B 19/41855; Y02P 90/02
See application file for complete search history.

(56) References Cited

U.S. PATENT DOCUMENTS

| 7,190,696 | B1 * | 3/2007 | Manur | H04L 45/38 370/392 |
| 2017/0232612 | A1 * | 8/2017 | Gallagher | B25J 9/16 700/249 |
| 2019/0262991 | A1 * | 8/2019 | Sugiyama | B25J 9/1607 |
| 2020/0012258 | A1 * | 1/2020 | Yung | G05B 19/4063 |
| 2022/0219322 | A1 * | 7/2022 | Rácz | B25J 9/1653 |

FOREIGN PATENT DOCUMENTS

| EP | 3194123 A1 * | 7/2017 | ............. B25J 13/00 |
| WO | 2014124701 A1 | 8/2014 | |

OTHER PUBLICATIONS

Koubaa, A. et al., "ROSLink: Bridging ROS with the Internet-of-Things for Cloud Robotics", Studies in Computational Intelligence: Robot Operating System (ROS) The Complete References (vol. 2), vol. 707, Jun. 7, 2017, pp. 265-283, Springer.

* cited by examiner

Primary Examiner — Ian Jen
Assistant Examiner — Renee LaRose
(74) Attorney, Agent, or Firm — COATS & BENNETT, PLLC

(57) ABSTRACT

A packet forwarding circuit (18), such as a programmable switch or router, for example, is disposed between a control server (14) and one or more actuators (17) associated with a robotic arm (16), for example. The packet forwarding circuit is configured to perform real-time velocity control of the one or more actuators in addition to other functionalities that it normally performs, such as routing, packet forwarding, and firewall protection.

18 Claims, 15 Drawing Sheets

| KEY | ACTION |
|---|---|
| META.T_TID = 0 | SET_TARGET(NEXT_TID=3, STEP_DURATION=5ms, T_POS1=22,...,T_POSN=10, T_VEL1=12,...,T_VELN=33) |
| META.T_TID = 3 | SET_TARGET(NEXT_TID=5, STEP_DURATION=3ms, T_POS1=26,...T_POSN=0, T_VEL1=1,...T_VELN=30) |
| ⋮ | ⋮ |

TRAJECTORY TABLE

FIG. 3A

| KEY | ACTION |
|---|---|
| META.DIRECTION=1, META.VELOCITY=X/Y | SET_VELOCITY("1.2233") |
| META.DIRECTION=0, META.VELOCITY=A/C | SET_VELOCITY("-2.3454") |
| ... | ... |

VELOCITY ENCODING TABLE

FIG. 3B

TRAJECTORY TABLE

| KEY | ACTION |
|---|---|
| META.DEVICE_ID=0X12, META.T_ID=0 | SET_TARGET(NEXT_TID=1, STEP_DURATION=5ms, T_POS1=22,...T_POSN=10, T_VEL1=12,...T_VELN=33) |
| META.DEVICE_ID=0X12, META.T_ID=1 | SET_TARGET(NEXT_TID=2, STEP_DURATION=3ms,T_POS1=26,...T_POSN=0, T_VEL1=1,...T_VELN=30) |
| ⋮ | ⋮ |

FIG. 9

IN-NETWORK CONTROL OF ACTUATORS FOR ROBOTIC ARMS

TECHNICAL FIELD

This application relates generally to the control of actuators associated with robotic arms, and particularly to the real-time, in-network velocity control of an actuator using a packet forwarding circuit.

BACKGROUND

Over the past decade, there has been an increase in customer demand for the manufacturing industry to provide more customized products. To achieve this goal, many manufacturers make extensive use of robots. The robots may be grouped together in one or more robot cells, and are controlled using pre-programmed local robot controllers.

Personalized production is one of the key motivations for manufacturers to start leveraging new technologies that enable, for instance, an increase in the flexibility of production lines. Not only does high flexibility support fast reconfiguration of production lines and easy application development, but it is also, in general, needed to achieve cost effective, customized production. One way to achieve such fast reconfiguration and agile behavior is to move the functionality for controlling the robots from the preprogrammed local robot controllers to computer servers located in the edge cloud. However, both the edge cloud and the robot require a time-sensitive network connection with high end-to-end reliability.

Currently, programmable routers are configurable to perform more than just simple packet forwarding functions. So configured, programmable routers can reduce the latency associated with performing application-level calculations during communications. Further, to address the latency related to the transport of data packets, properly configured programmable routers split long control loops into many smaller control loops. Alleviating such control loop latency is very important in the field of robotics.

Another challenging issue with respect to robotics relates to the ability to satisfy the safety and reliability requirements of robot cell control. This issue is particularly important in situations where some control functions may be deployed on a cloud-based computer server that communicates with the robot cell over a wireless connection. Particularly, a poor wireless connection can cause control commands sent by a robot cell controller to the robots in a cell to be delayed or lost, thereby possibly leading to an undesirable or unsafe situation.

Most robots, such as the robotic arms utilized in industrial applications, for example, have associated custom Application Programming Interfaces (APIs). Some examples of such APIs include, but are not limited to, URScript for Universal Robots and C4G for Comau robots. These APIs facilitate access to the command functions of the robotic arms by an external robot controller. Thus, using the API, the external controller and the robotic arms can communicate at least two types of messages—control messages sent from the external controller to the robotic arm and status messages sent from the robotic arm to the external controller.

Generally, the messages communicated between the external robot controller and the robotic arm are similarly structured regardless of the particular API that is employed. For example, the status messages sent by the robotic arm to the external robot controller generally have a fixed structure and contain information related to the robotic arm. Such information includes, but is not limited to, the positions of one or more joints of the robotic arm in Cartesian space, the temperature of the servos on the robotic arm, the amount of energy the robotic arm has consumed, and the like. The structure of the command messages, however, depends on the way the robotic arm is controlled—i.e., via position, velocity, effort, or some hybrid combination of two or more of these aspects.

Communicating information between the external robot controller and the robotic arm regarding these aspects is challenging. And in many cases, addressing the issues associated with controlling the velocity and effort functions of a robotic arm is especially challenging. This is mostly due to the difficulty that certain entities have in handling the frequency of update messages. Additionally, conventional methods for controlling robotic arms typically implement their control functionality in the external robot controller, which as stated above, is usually separated from the robotic arm by the cloud network. Such design, unfortunately, leads to higher latency. To ensure lower latency, these conventional solutions require another controller to be deployed close to the robotic arm being controlled. However, not only does the additional equipment increase costs, but it also increases the complexity of the solution.

SUMMARY

Embodiments of the present disclosure dispose a packet forwarding circuit, such as a programmable switch or router, for example, between a control server and one or more actuators. The actuators may be associated with a robotic arm, and the control server may be a robot control server in a cloud network that generates trajectory information for the robotic arm. In addition to the functionalities that it normally performs, such as packet routing, packet forwarding, and firewall protection. A packet forwarding circuit configured according to the present embodiments perform real-time velocity control of the actuators. Such real-time control greatly reduces the latency that is normally present in conventional systems where the robot control server performs the real-time velocity control.

In one embodiment, the present disclosure provides a method for controlling an actuator. The method is implemented by a packet forwarding circuit disposed between a control server and an actuator, and calls for the packet forwarding circuit to receive trajectory information from the control server. The received trajectory information is for controlling the actuator, and defines a sequence target points along a trajectory that is to be followed by the actuator. The method also calls for the packet forwarding circuit to receive a status message from the actuator. The status message comprises status information about the actuator. Based on the status information and the received trajectory information, the method calls for the packet forwarding circuit to generate a command message to control the actuator, and then send the command message to the actuator.

In another embodiment, the present disclosure provides a packet forwarding circuit disposed between a control server and one or more actuators. In this embodiment, the packet forwarding circuit comprises communications circuitry and processing circuitry. The communications circuitry is configured to communicate with both the control server and the one or more actuators. The processing circuitry is operatively connected to the communications circuitry and configured to receive trajectory information from the control server. The trajectory information is for controlling the actuator, and defines a sequence target points along a trajectory that is to be followed by the actuator. The processing circuitry is also configured to receive a status message from the actuator. The status message comprises status information about the actuator. The processing circuitry is also configured to generate a command message to control the actuator based on the status information and the received trajectory information, and send the command message to the actuator.

In another embodiment, the present disclosure provides a non-transitory computer-readable medium that stores a computer program thereon. The computer program comprises instructions that, when executed by processing circuitry of a packet forwarding circuit disposed between a control server and one or more actuators, causes the packet forwarding circuit to receive trajectory information from the control server. The trajectory information is for controlling the actuator, and defines a sequence target points along a trajectory that is to be followed by the actuator. The instructions also cause the packet forwarding circuit to receive a status message from the actuator. The status message comprises status information about the actuator. The instructions also cause the packet forwarding circuit to generate a command message to control the actuator based on the status information and the received trajectory information, and send the command message to the actuator.

In another embodiment, the present disclosure provides a computer program comprising executable instructions that, when executed by processing circuitry of a packet forwarding circuit disposed between a control server and one or more actuators, causes the packet forwarding circuit to receive trajectory information for controlling the actuator from the control server. The trajectory information defines a sequence target points along a trajectory that is to be followed by the actuator. The instructions also cause the packet forwarding circuit to receive a status message from the actuator. The status message comprises status information about the actuator. The instructions also cause the packet forwarding circuit to generate a command message to control the actuator based on the status information and the received trajectory information, and send the command message to the actuator.

BRIEF DESCRIPTION OF THE DRAWINGS

FIG. 3A illustrates a structure for a trajectory table stored at the packet forwarding circuit according to one embodiment of the present disclosure.

FIG. 3B illustrates a structure for a velocity encoding table stored at the packet forwarding circuit according to one embodiment of the present disclosure.

FIG. 9 illustrates a structure for a trajectory table stored at the packet forwarding circuit according to another embodiment of the present disclosure.

DETAILED DESCRIPTION

Figure 1:
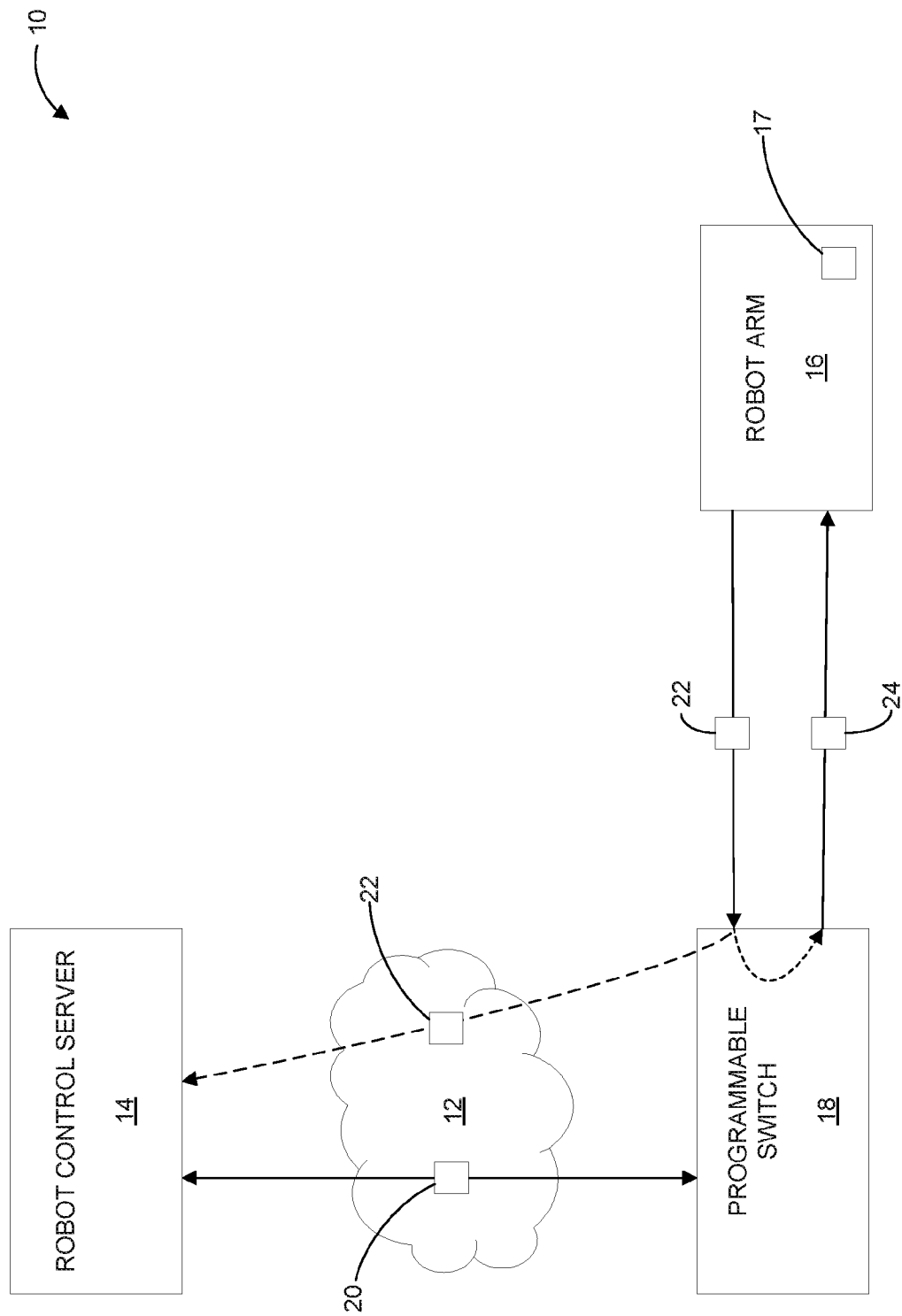
FIG. 1 is a functional block diagram of a system configured according to one embodiment of the present disclosure.

The embodiments of the present disclosure configure packet forwarding circuits to perform real-time velocity control of one or more actuators in addition to their traditional functionalities (e.g., routing, packet forwarding, firewall protection, etc.). The packet forwarding circuits configured according to the present disclosure can perform more complex tasks faster than their cloud-based computer server counterparts (e.g., an external control server), making the deployment and operation of Programmable Logic Controllers (PLCs) and other extra components needed for controlling the actuators unnecessary.

In this disclosure, the present embodiments are described in the context of controlling the actuators associated with a robotic arm. However, those of ordinary skill in the art should readily appreciate that this is for illustrative purposes, and that the present embodiments are not limited solely to control of robotic arms. Rather, the present embodiments can be applied to any packet forwarding circuit having one or more fixed functions. As such, the robotic arms mentioned herein can be replaced by any device associated with one or more actuators that require periodic control signals (e.g., the velocity control for a servo motor requires control signals between 100 Hz-1000 KHz), and that may or may not be controlled in a synchronized manner.

For example, in one embodiment, an external robot controller (e.g., a computer server) is communicatively connected to a robotic arm via a private or public cloud network. Movement of the robotic arm is controlled via one or more actuators. A packet forwarding circuit, such as a programmable switch or a programmable router, for example, is operatively connected to the cloud network between the external robot controller and the robotic arm. In operation, the external robot controller calculates a trajectory for the robotic arm, and uploads that trajectory to the programmable switch. As described in more detail later, a "trajectory" is a sequence of target points (i.e., set points) along a trajectory "curve." Each target point defines position information and/or velocity information, along with timing information, that the actuator is to follow when moving the robotic arm. In some embodiments, the external robot controller uploads the entire trajectory to the packet forwarding circuit at one time, while in other embodiments, the external robot controller uploads the trajectory in portions to the packet forwarding circuit. Regardless of whether the trajectory is uploaded all at once or in portions, the packet forwarding circuit receives status messages from the actuators regarding the status of the actuators. Based on the trajectory information and/or the received status messages, the packet forwarding circuit generates control messages to control the velocity of the actuator as it moves along its trajectory and sends the control messages to the actuator.

The present embodiments may communicate messages in any format needed or desired. For example, in one embodiment of the present disclosure, the messages communicated between the packet forwarding circuit and the robotic arm are binary messages. In another embodiment, the communicated messages are text-based messages. Regardless of their particular format, however, embodiments of the present disclosure are configured to communicate the messages as datagrams, or stream the messages using the Transmission Control Protocol (TCP).

Additionally, in some embodiments, the packet forwarding circuit is configured to calculate the time duration between two consecutive target points along the trajectory. Such calculation may be effected by addition, subtraction, or bit-shifting. Each time duration defines an amount of time the robotic arm has to move from a first target point to a second target point. To accomplish these calculations, the packet forwarding circuit may implement, for example, a proportional integral derivative (PID) or similar control algorithm.

Turning now to the drawings, FIG. 1 is a block diagram of a communications system 10 configured according to one embodiment of the present disclosure. Although the embodiment of FIG. 1 illustrates system 10 in the context of an industrial environment, such as manufacturing for example, the present disclosure is not so limited. Those of ordinary skill in the art will readily appreciate that the discussion of the present embodiments in the context of manufacturing is illustrative only, and that the embodiments described herein may be implemented in any environment in which robots are controlled to perform pre-defined actions.

As seen in FIG. 1, system 10 comprises a public or private cloud-based communications network 12 communicatively connecting a robot control server 14 to a robotic arm 16 having one or more actuators 17, and a packet forwarding circuit 18. In operation, robot control server 14 calculates a trajectory 30 (see FIG. 2) for the robotic arm 16, and sends that trajectory 30 to packet forwarding circuit 18 via network 12 in one or more messages 20. Packet forwarding circuit 18 also receives one or more status messages 22 from robotic arm 16 that inform packet forwarding circuit 18 of the state information for the actuators 17 of robotic arm 16. In some embodiments, packet forwarding circuit 18 sends the status messages 22 on to the robot control server 14. However, in this case, packet forwarding circuit 18 is also configured to store the state information it receives in the status messages 22 in its registers. The registers may be accessed for reading and writing by the packet forwarding circuit, but not by the robotic arm 16 and the external robot control server 14.

Based on the status information contained in the status messages 22 and/or the trajectory information contained in the trajectory messages 30, the packet forwarding circuit 18 generates one or more control messages 24 to control the actuators 17 to move robotic arm 16. For example, in one embodiment, packet forwarding circuit 18 calculates, for each actuator 17 it controls, a velocity vector for the actuators 17 to follow to move the robotic arm 16 to timely reach the next target point 32 along trajectory 30. So determined, packet forwarding circuit 18 encodes the new velocity vector into a command message 24 and sends that message to an actuator 17 of robotic arm 16 to control its movements and velocity with respect to those movements.

Figure 2:
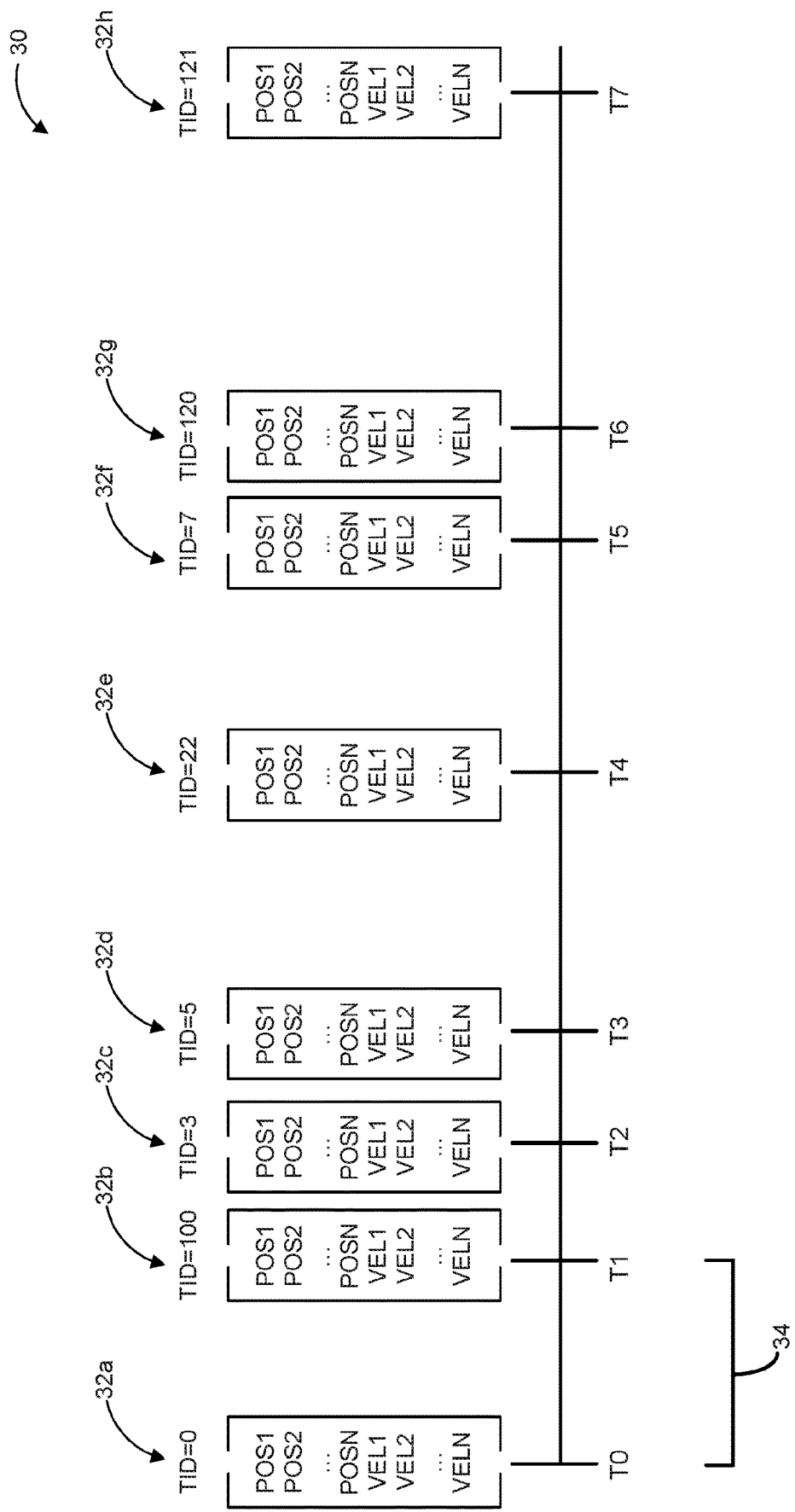
FIG. 2 illustrates trajectory as a sequence of target points according to one embodiment of the present disclosure.

FIG. 2 illustrates the information that may comprise an exemplary trajectory 30 in more detail. As seen in FIG. 2, trajectory 30 comprises a sequence of target points 32a-32h (collectively referred to herein as "target points 32"). Each target point 32a-32h is identified by a unique Target ID (TID), and in this embodiment, defines a sequence of joint positions (POS1 . . . POSN) and corresponding joint velocities (VEL1 . . . VELN) for a continuous trajectory curve along which an actuator 17 will move robotic arm 16. Each target point 32a-32h also includes respective timing information that defines an amount of time the actuator 17 has to move the robotic arm 16 from a first target point 32 to a second target point 32. As seen in FIG. 2, such timing information is computed as a step duration 34 between a time T0 for a first target point 32a and a time T1 for a consecutive second target point 32b.

As previously stated, some embodiments of the present disclosure configure the robot control server 14 to upload the information for an entire trajectory 30 to packet forwarding circuit 18. In other embodiments, however, the present disclosure configures the robot control server 14 to upload trajectory 30 to packet forwarding circuit 18 in portions. By way of example only, the robot control server 14 may upload the trajectory 30 in portions. Each uploaded portion of trajectory 30 contains less than all of the target points 32, but comprises enough target points 32 to control actuator 17 to define the movements of robotic arm 16 over the trajectory 30 for a predetermined length of time (e.g., typically from 100 ms to a few seconds). Regardless of whether the robot control server 14 sends the information comprising a trajectory 30 all at once or in portions, however, packet forwarding circuit 18 writes the trajectory 30 to a trajectory table stored in memory of the packet forwarding circuit 18.

FIG. 3A illustrates a structure for a trajectory table 40 according to one embodiment. As seen in FIG. 3A, trajectory table 40 comprises one or more rows and two columns—"KEY" and "ACTION." The KEY fields store the TID of the current target point in the sequence of target points 32 (e.g., 0 for target point 32a in FIG. 2). The ACTION field stores the name of a command function "SET_TARGET( )" along with its corresponding information associated with the next target point in the trajectory 30 (e.g., 3 for target point 32b in FIG. 2).

In operation, trajectory table 40 "chains" the steps that the actuators 17 must perform along trajectory 30 to control robotic arm 16, and reduces the number of interactions packet forwarding circuit 18 has with the robot control server 14. In particular, the packet forwarding circuit obtains a target id for a current target point 32. Once obtained, trajectory table 40 applies an exact matching approach on META.T_TID to identify the correct row for the current target point 32. If there is a match, the SET_TARGET( ) action populates the information for the current target point 32 into corresponding metadata fields. As seen in FIG. 3A, such fields include, but are not limited to:

The next target id (i.e., the key (i.e., TID) of the next target point in the sequence. Packet forwarding circuit 18 will move to this target point when the actuator 17 has completed the movements of robotic arm 16 defined by the current target point);

The step duration (i.e., the amount of time actuator 17 has to control robotic arm 16 to reach the next target point 32 in the sequence); and The position and velocity values of the robotic arm 16 (e.g., a joint of the robotic arm 16) associated with the next target point 32.

As previously described, packet forwarding circuit 18 also calculates a velocity vector for actuator 17 and sends it to the actuator 17 in a command message. Before sending the velocity vector, however, packet forwarding circuit 18 first places the calculated velocity vector into an appropriate format. This format is seen in the velocity encoding table 50 of FIG. 3B.

Similar to the trajectory table 40, the velocity encoding table 50 also comprises one or more rows and two columns—"KEY" and "ACTION." The KEY field stores information indicating a direction (i.e., META.DIRECTION) and a velocity (META.VELOCITY). The direction can be a binary value (i.e., 0 or 1) to indicate an increase or decrease in the velocity of a given actuator 17 for the current target point. The velocity is the absolute velocity for the actuator 17. The ACTION field stores a command function "SET_VELOCITY( )" used to set the velocity for the actuator 17.

In operation, the present embodiments utilize the velocity encoding table 50 to format the calculated value for the velocity vector into a specific format (e.g., a string in embodiments where the command messages sent to the robotic arm 16 are text messages). In more detail, the present embodiments use the direction and absolute velocity values as keys that map to a byte string in the ACTION column. The string represents the actual velocity in a given format. Further, the present embodiments configure packet forwarding circuit 18 to apply a ternary match on the velocity values rather than an exact match approach. This enables packet forwarding circuit 18 to round the values used as the key with arbitrary precision. In situations where text commands are used, packet forwarding circuit 18 uses header fields of fixed length to express the values. By way of example only, packet forwarding circuit 18 may pad the header fields with zeros or spaces, or add the string to the end of a string representation.

As described later, configuring packet forwarding circuit 18 to send such information as a string provides advantages over conventionally configured switches. Particularly, conventionally configured switches are not able to perform string operations, and they do not provide support for application headers in text format. A packet forwarding circuit 18 configured according to the present embodiments, however, addresses both these limitations of conventionally configured switches.

Figure 4:
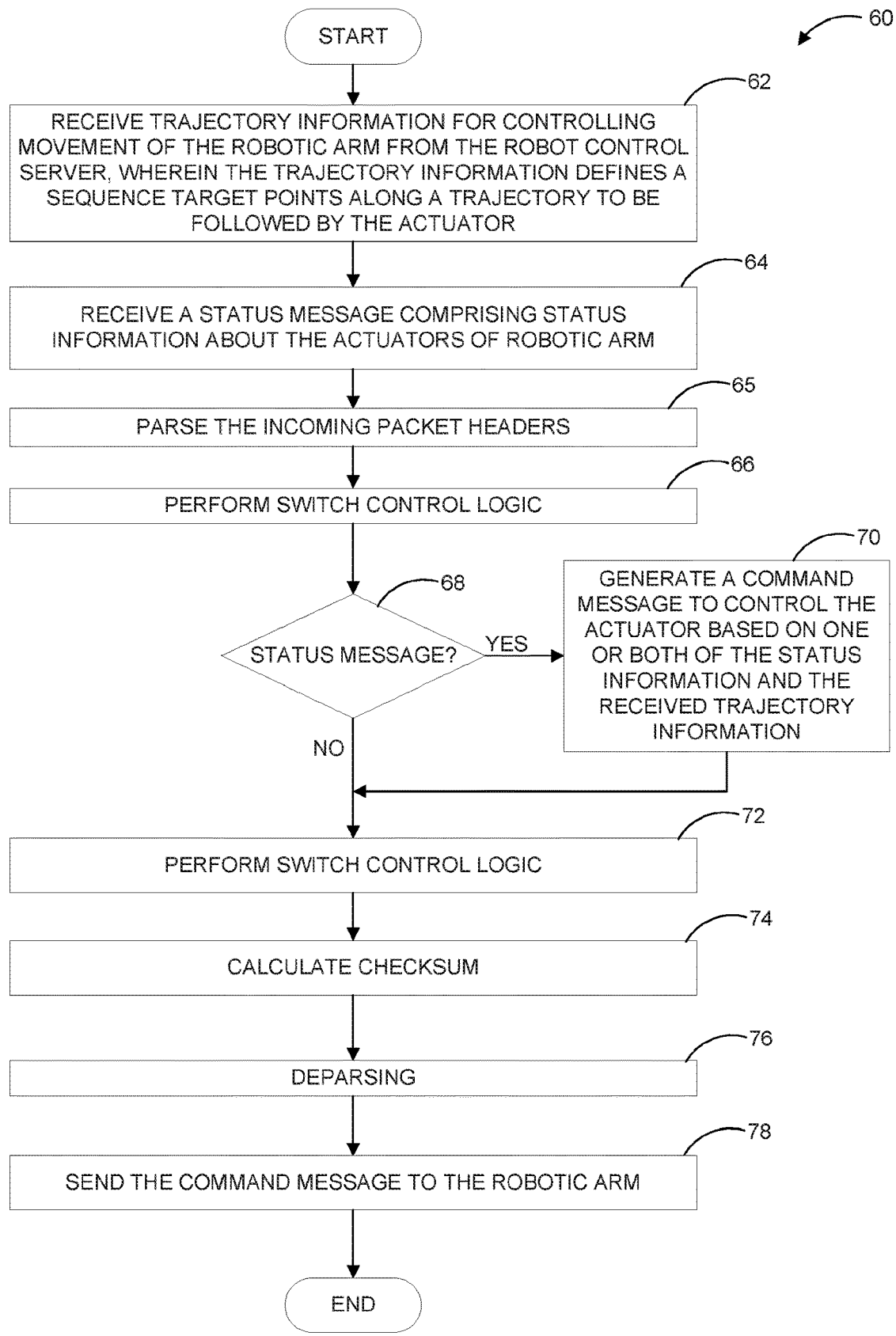
FIG. 4 is a flow diagram illustrating a method for controlling an actuator according to one embodiment of the present disclosure.

FIG. 4 is a flow diagram illustrating a method 60 for controlling the velocity of an actuator 17 that controls a joint of robotic arm 16 according to one embodiment of the present disclosure. As seen in FIG. 4, the packet processing "pipeline" of method 60 begins with packet forwarding circuit 18 receiving trajectory information from the robot control server 14 (box 62). The trajectory information defines the set of target points 32 along trajectory 30 to be followed by the actuator 17. Additionally, packet forwarding circuit 18 also receives status messages 22 from the actuators 17 of robotic arm 16 (box 64). The status messages 22 comprise information that inform the packet forwarding circuit 18 about the state of the robotic arm 16, as previously described. Packet forwarding circuit 18 then parses the headers of the incoming packets for handing the status and command messages (box 65) and executes its switch control logic (box 66) to perform its "normal" processing of the incoming packets (e.g., the forwarding or routing of the messages).

Next, packet forwarding circuit 18 determines whether the incoming message is a status message 22. In one embodiment, this can be determined by determining whether the incoming message contains a status message header. If not, packet forwarding circuit 18 performs any additional switch control logic (e.g., traditional switching or routing functions) (box 72), recalculates the checksum of the packet, if needed (box 74), and deparses the packet (box 76) before sending the command message to robotic arm 16. The deparsing process includes, in at least some embodiments, the serialization of the command messages.

If the packet does contain a status message header (box 68), packet forwarding circuit 18 generates a command message 24 (box 70) to control the actuator 17 based on the status information received from the robotic arm 16, and the trajectory information received from the robot control server 14. The command message 24 is then processed, as previously described, and sent to the robotic arm 16 (box 78).

Figure 5:
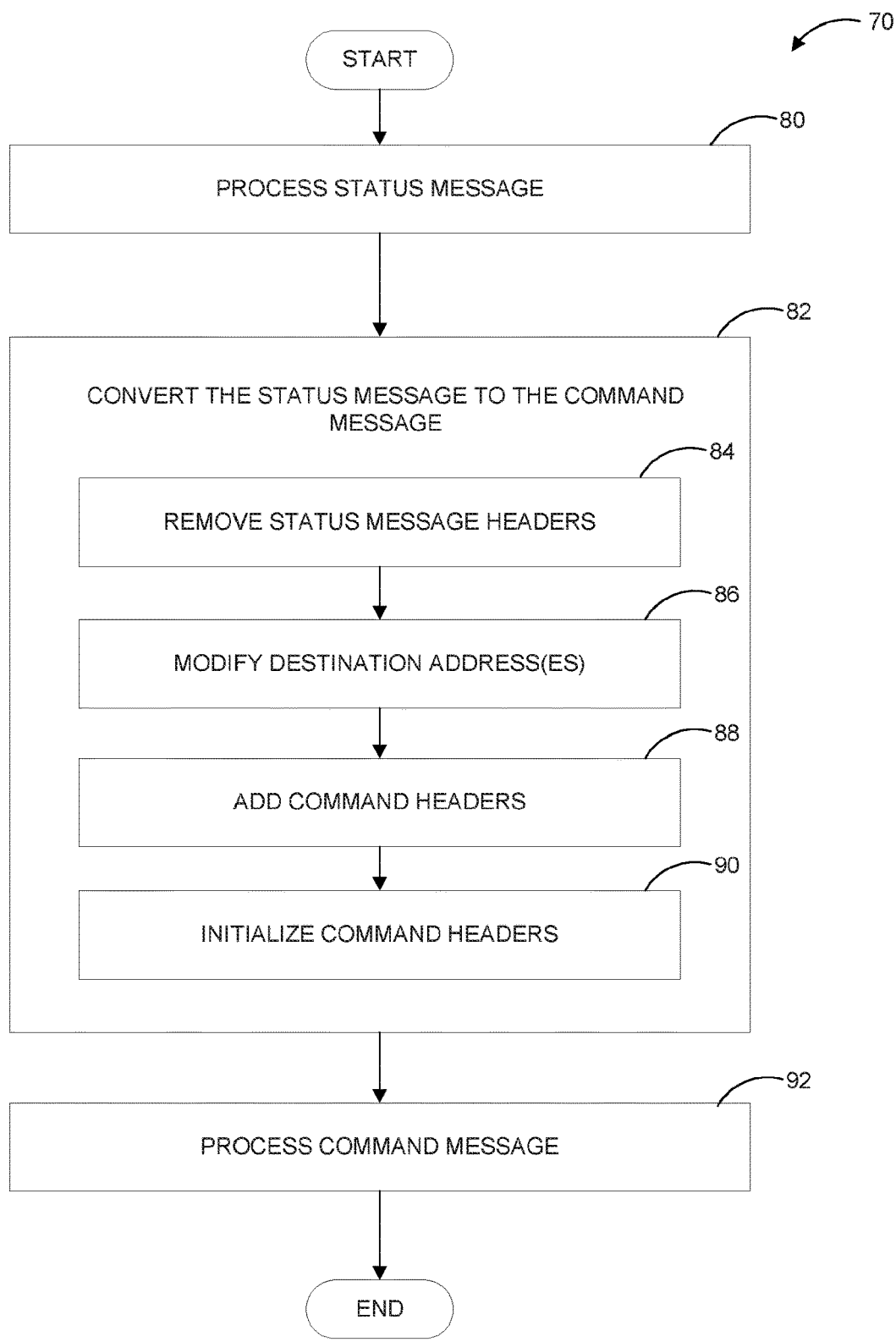
FIG. 5 is a flow diagram illustrating a method for generating a command message to control an actuator according to one embodiment of the present disclosure.

FIG. 5 is a flow diagram illustrating the command message generating step 70 in more detail. As seen in FIG. 5, generating the command message 24 begins with the packet forwarding circuit 18 processing the status message 22 received from robotic arm 16 (box 80). Packet forwarding circuit 18 then converts the received status message 22 to the command message 24 (box 82). In this embodiment, packet forwarding circuit 18 converts the status message by removing the status message headers (box 84), modifying the destination address(es) to reflect the address of the robotic arm 16 (box 86), and then adds and initializes the command message headers (boxes 88, 90). Once generated, packet forwarding circuit 18 then processes the command message for delivery to the robotic arm 16 to control actuator 17. Thus, by performing this function, packet forwarding circuit 18 reduces the latency associated with communicating command messages 24 from the robot control server 14.

Figure 6:
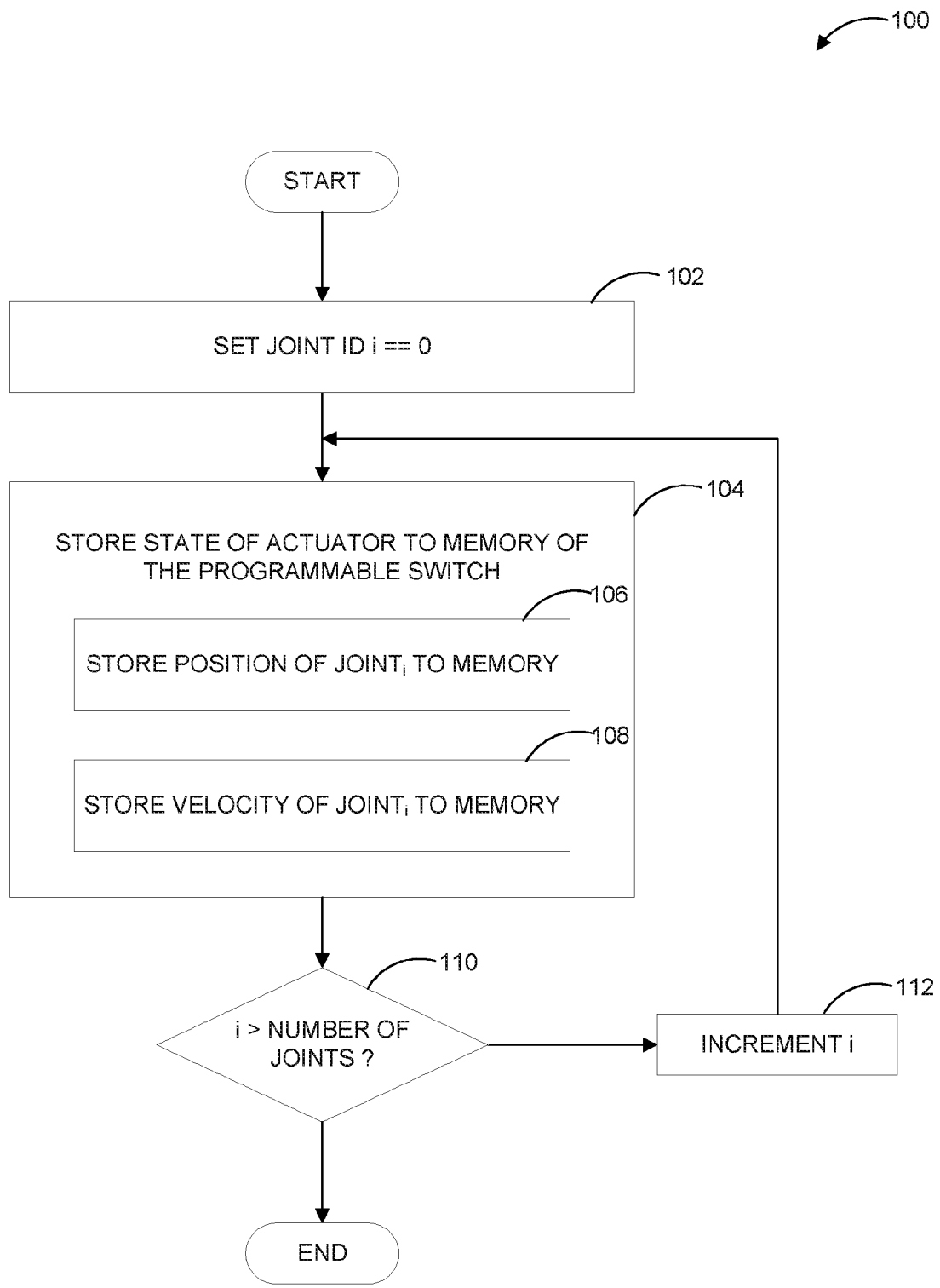
FIG. 6 is a flow diagram illustrating a method for storing state information for an actuator that controls a motor that moves a robotic arm according to one embodiment of the present disclosure.

FIG. 6 is a flow diagram illustrating how the information in the status messages 22 received from the actuators 17 of robotic arm 16 are handled and stored in memory of packet forwarding circuit 18 for use in computing the velocity vectors, as previously described. In this embodiment, each robotic arm 16 comprises an articulating arm having one or more joints and the packet forwarding circuit 18 maintains two register arrays for each robotic arm 16—an REGpos array and a REGvelocity array. The registers, as previously stated, are accessible only to the packet forwarding circuit and not to the robot control server 14 and robotic arm 16. The REGpos array is configured to store the current position (i.e., smsg.joint[i].pos) of each actuator 17 associated with each joint of robotic arm 16. The REGvelocity array is configured to store the velocity values (i.e., smsg.joint[i].velocity) of actuator 17 associated with each joint of robotic arm 16. As previously stated, these values are reported by robotic arm 16 in the status messages 22.

The joints of robotic arm 16 are indexed from 0 to num_joints-1. Therefore, as seen in FIG. 6, method 100 first initiates a joint_ID variable to 0 to indicate the first joint of robotic arm 16 (box 102). Packet forwarding circuit 18 then proceeds to store the state information of the actuator 17 for joint_ID to the memory of packet forwarding circuit 18 (box 104). In particular, this embodiment of the present disclosure stores the position and velocity of each joint$_i$ to corresponding elements in the REGpos array and REGvelocity array, respectively (boxes 106, 108). Packet forwarding circuit 18 then determines whether there are more joints to process (box 110). If so, packet forwarding circuit 18 increments the joint_ID variable and repeats the steps of method 100. If not, method 100 ends.

Figure 7A:
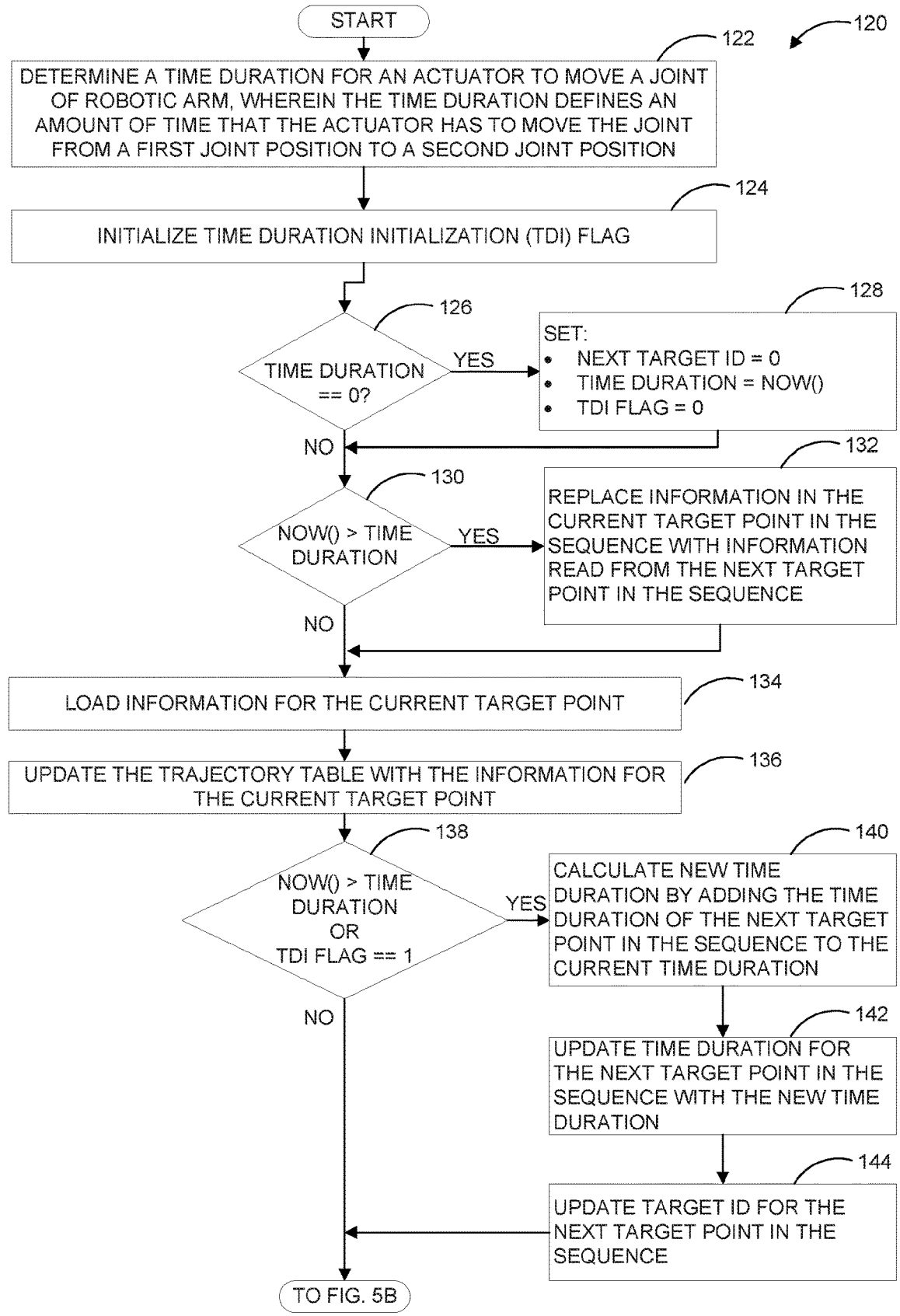
FIGS. 7A-7B are flow diagrams illustrating a method for calculating a velocity vector for an actuator according to one embodiment of the present disclosure.
Figure 7B:
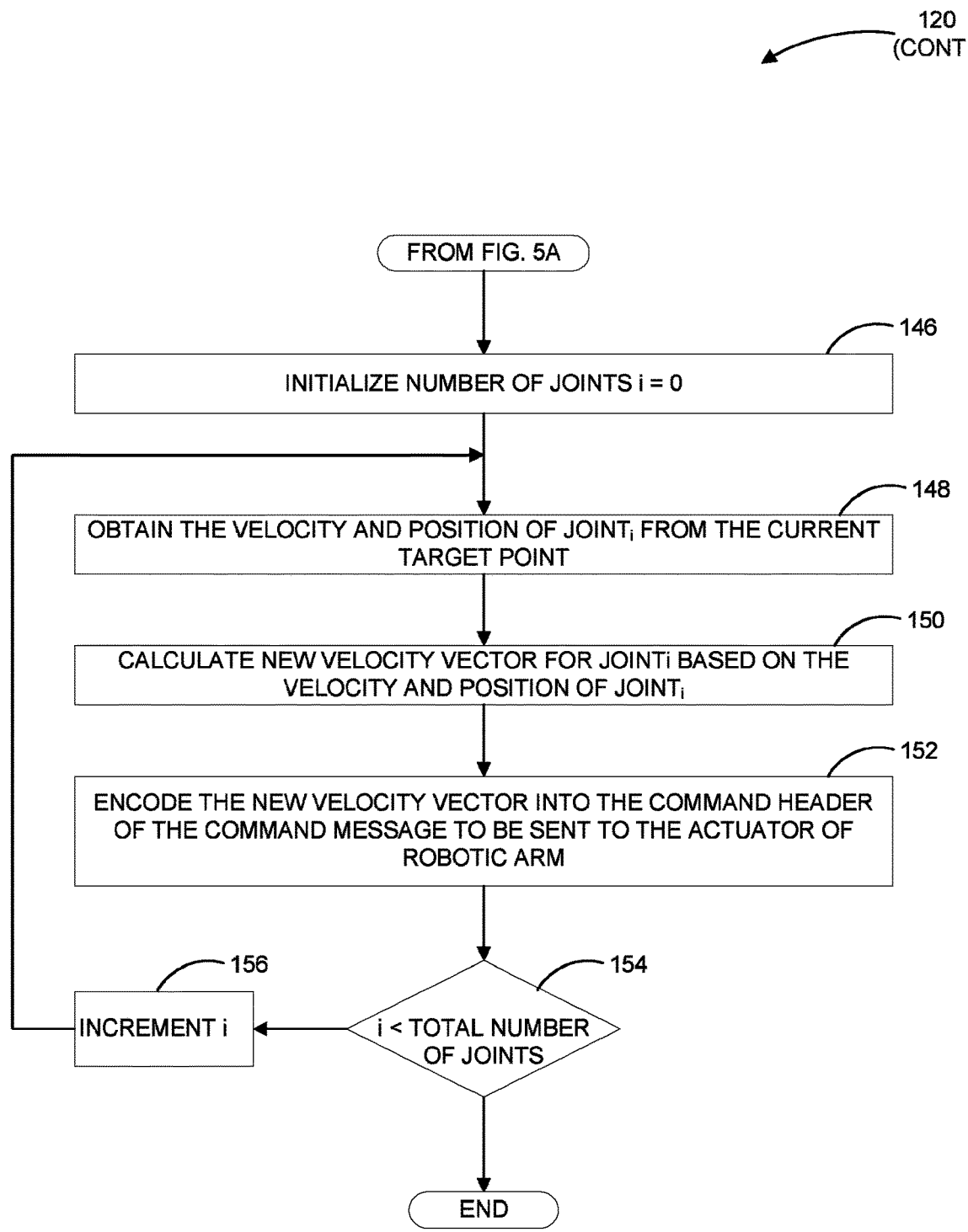

FIGS. 7A-7B are flow diagrams illustrating a method 120 for controlling robotic arm 16 according to the present disclosure in more detail. The method assumes that the header structure for command message 24 used to control robotic arm 16 has already been prepared as previously described.

Method 120 first calls for packet forwarding circuit 18 to determine a time duration for an actuator 17 of robotic arm 16 (e.g., an actuator 17 that is associated with a joint of the robotic arm 16) (box 122). In one embodiment, the time duration is obtained from register REGnext_time in the trajectory table 40, and defines the amount of time the actuator 17 needs to move the joint of robotic arm 16 to reach the current target 32 point along trajectory 30. The packet forwarding circuit 18 next initializes a time duration initialization (TDI) flag based on the value in REGnext_time (box 124). Particularly, if REGnext_time contains a value (i.e., the actuator 17 is already being controlled by packet forwarding circuit 18), then the TDI flag is set to 1. Alternatively, if REGnext_time does not contain a value (i.e., the packet forwarding circuit 18 has not yet started to control the actuator 17), then the TDI flag is set to 0. This latter value of zero indicates that the packet forwarding circuit 18 is not yet initialized.

Next, method 120 calls for the packet forwarding circuit 18 to initialize some local variables based on the time duration value. In this embodiment, packet forwarding circuit 18 determines whether the time duration value obtained from REGnext_time is a zero value (box 126). If the time duration value is 0, packet forwarding circuit sets (box 128):

the next TID to 0 (identifying the TID of the next target point in the sequence);

the TDI flag to 1 (indicating that the packet forwarding circuit 18 is now initialized); and overwrites the time duration value with the current time.

Once the local variables are set, or if the time duration value obtained from REGnext_time is not a zero value, packet forwarding circuit 18 determines whether the end of the current target point has been reached. In one embodiment, this can be accomplished by comparing the time duration value obtained from REGnext_time to the current time (box 130). If the current time is greater than the time duration value obtained from REGnext_time, then the end of the current target point has been reached. In this case, packet forwarding circuit 18 replaces the information in the current target point of the sequence with information that is read from the next target point in the sequence (box 132). Particularly, the TID of the current target point is replaced with the TID of the next target point in the sequence. Packet forwarding circuit 18 then loads the information for the current target point (box 134) and updates the trajectory table 40 with that information (box 136). This information will later be utilized to compute the new velocity vector for the actuator 17 to control the robotic arm 16.

Packet forwarding circuit 18 then determines whether the next target point in the sequence has been reached (box 138). To accomplish this, packet forwarding circuit 18 can, in one embodiment, compare the current time to the previously obtained time duration value. In another embodiment, however, packet forwarding circuit 18 checks the value of the TDI flag. Regardless, if the next target point in the sequence has been reached, packet forwarding circuit 18 calculates a new time duration value by adding the time duration of the next target point in the sequence to the time duration of the current target point (box 140). Packet forwarding circuit then updates the time duration value for the next target point in the sequence with the newly calculated time duration value (box 142) and updates the TID of the next target point in the sequence (144).

Next, packet forwarding circuit 18 computes the new velocity vector for each joint of robotic arm 16. In particular, packet forwarding circuit 18 initializes a local variable i representing the number of joints of robotic arm 16 to 0 (box 146). Then, for each joint i, packet forwarding circuit 18 obtains the velocity and position of the actuator 17 associated with that joint (box 148), calculates a new velocity vector for the actuator 17 based on the joint position and velocity (box 150), and encodes the new velocity vector into the header of the command message 24 to be sent to the actuator 17 of robotic arm 16 (box 152). Packet forwarding circuit 18 then checks to see whether all joints have been processed (box 154). If not, the local variable i is incremented (box 156) and the process is repeated for the next joint. Otherwise, the method 120 ends.

Figure 8:
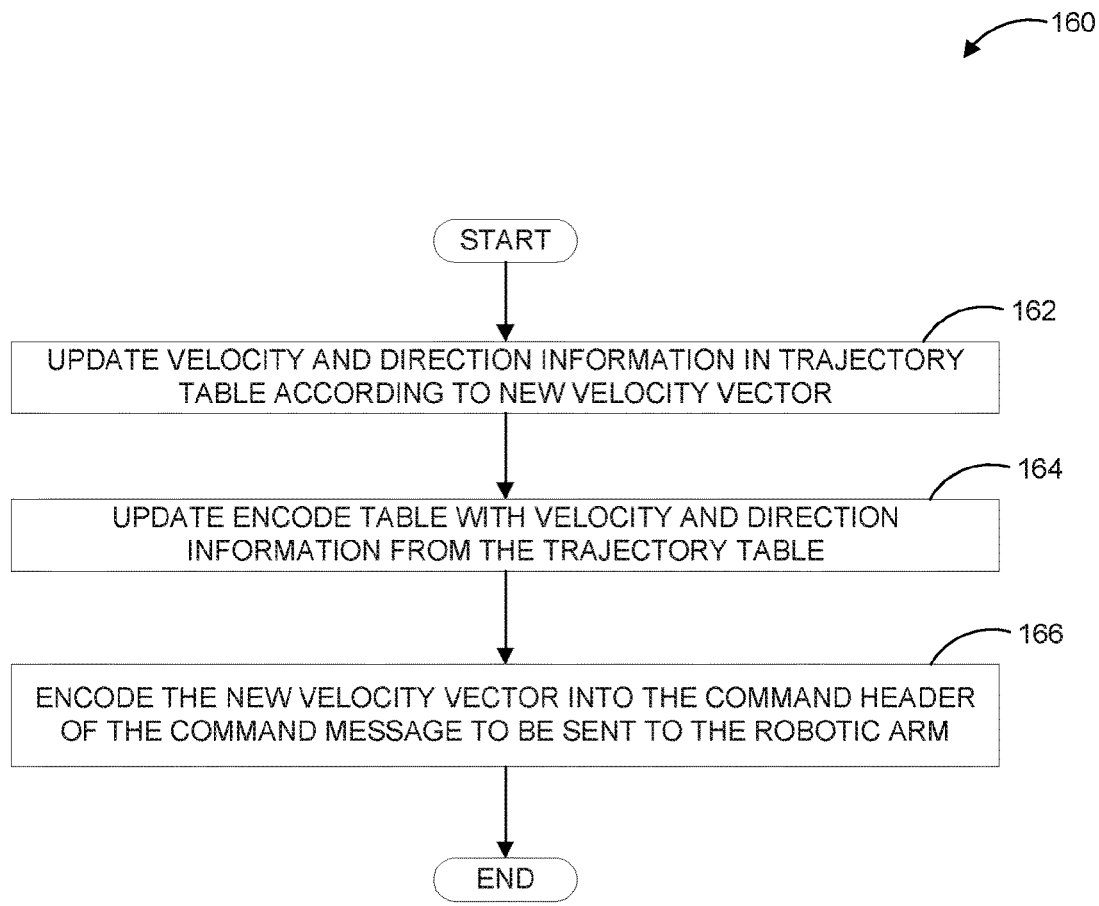
FIG. 8 is a flow diagram illustrating a method for updating tables in a memory of a packet forwarding circuit according to one embodiment of the present disclosure.

FIG. 8 is a flow diagram illustrating a method 160 for encoding the header of the command message with the newly calculated velocity vector. As seen in FIG. 8, packet forwarding circuit 18 first updates the velocity and direction information in the trajectory table 40 with the velocity and direction information of the newly calculated velocity vector (box 162). Packet forwarding circuit 18 then updates the encode velocity table with the same information (box 164), and encodes the new velocity vector into the command message (box 166). To accomplish the encoding, one embodiment of the present disclosure updates a velocity field for the actuator 17 in the command message with the velocity and direction information from the trajectory table 40.

The previous embodiments illustrate packet forwarding circuit 18 controlling a single actuator 17 for a single robotic arm 16 having one or more joints. However, those of ordinary skill in the art will readily appreciate that this is merely for illustrative purposes, and that the methods described herein for controlling actuator 17 can also be applied to controlling multiple actuators 17 for multiple robotic arms 16, each having one or more joints. To accomplish this, embodiments of the present disclosure modify the key field in the trajectory table 40 to also include a device ID that identifies the particular actuator 17 being controlled, as seen in FIG. 9. Tracking the device ID is helpful as the different robotic arms 16 have different actuators 17—each of which may or may not follow a different trajectory 30.

Additionally, to support the control of multiple actuators 17 for multiple robotic arms 16, packet forwarding circuit 18 should be upfitted with additional memory resources. These resources are used according to the present disclosure to store the states, positions, and velocity vectors of the actuators 17. More particularly, the states, positions, and velocity vectors of each actuator 17 should be stored separately.

Figure 10:
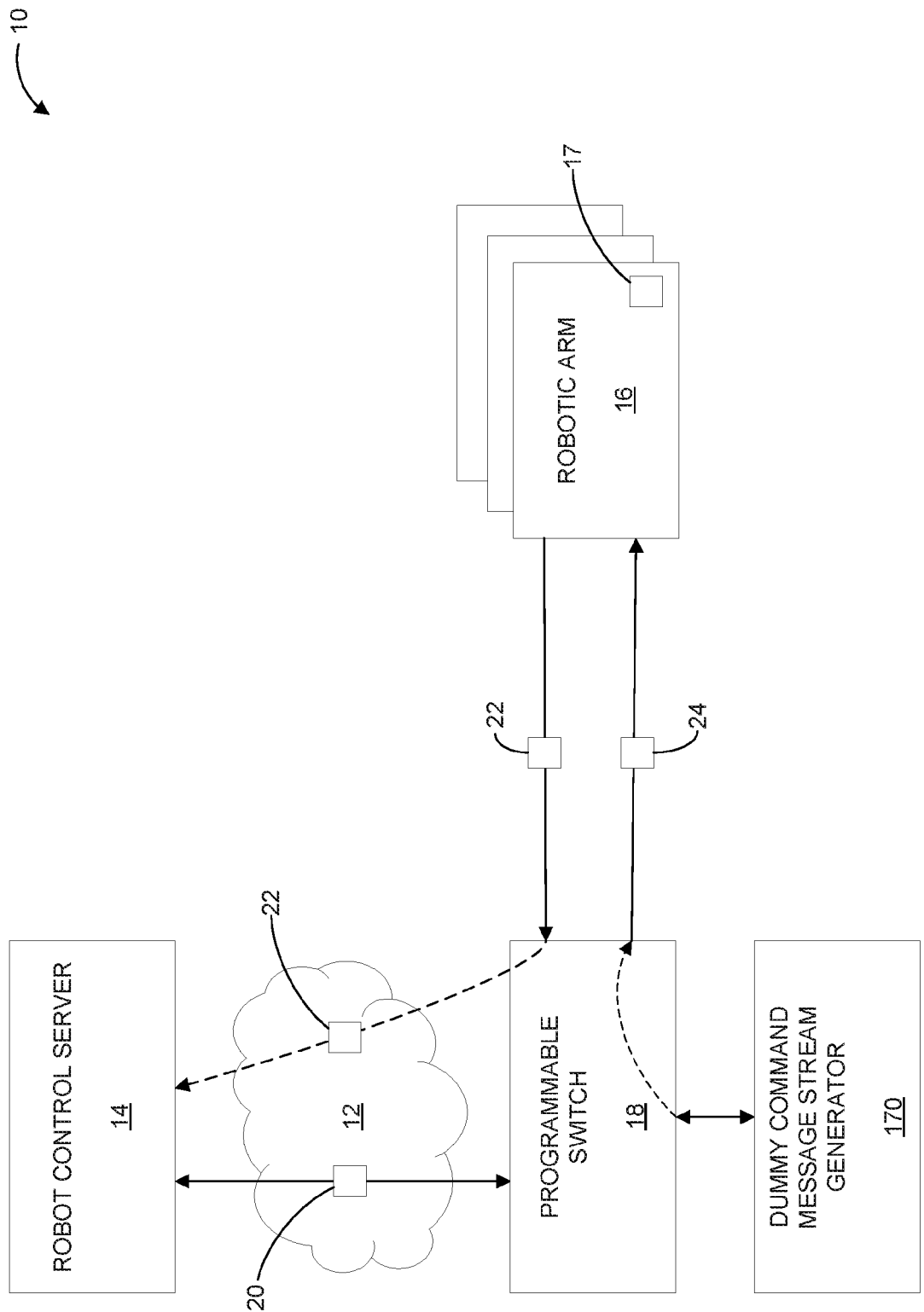
FIG. 10 is a functional block diagram of a system configured according to another embodiment of the present disclosure.

The previous embodiments describe the present disclosure as communicating datagrams to control actuators 17 of robotic arm 16. However, the present disclosure is not so limited. Particularly, in some situations, the robotic arms 16 (e.g., UR5 robotic arms) provide an API that can only be accessed using TCP. As is known in the art, TCP is a stateful protocol that is more difficult for existing packet forwarding circuits/ASICs, like BAREFOOT TOFINO for example, to handle. Therefore, the present embodiments, such as the embodiment seen in FIGS. 10, for example, utilize a "Dummy Command Message" generator 170 to generate the command messages 24 that are sent to the actuators 17 of robotic arms 16. In one embodiment, the Dummy Command Message generator 170 is integrated with the packet forwarding circuit 18 (e.g. running on its CPU). In other embodiments, however, the Dummy Command Message generator 170 functionality is integrated with the robot control server 14 or is a separate node in system 10.

Figure 11:
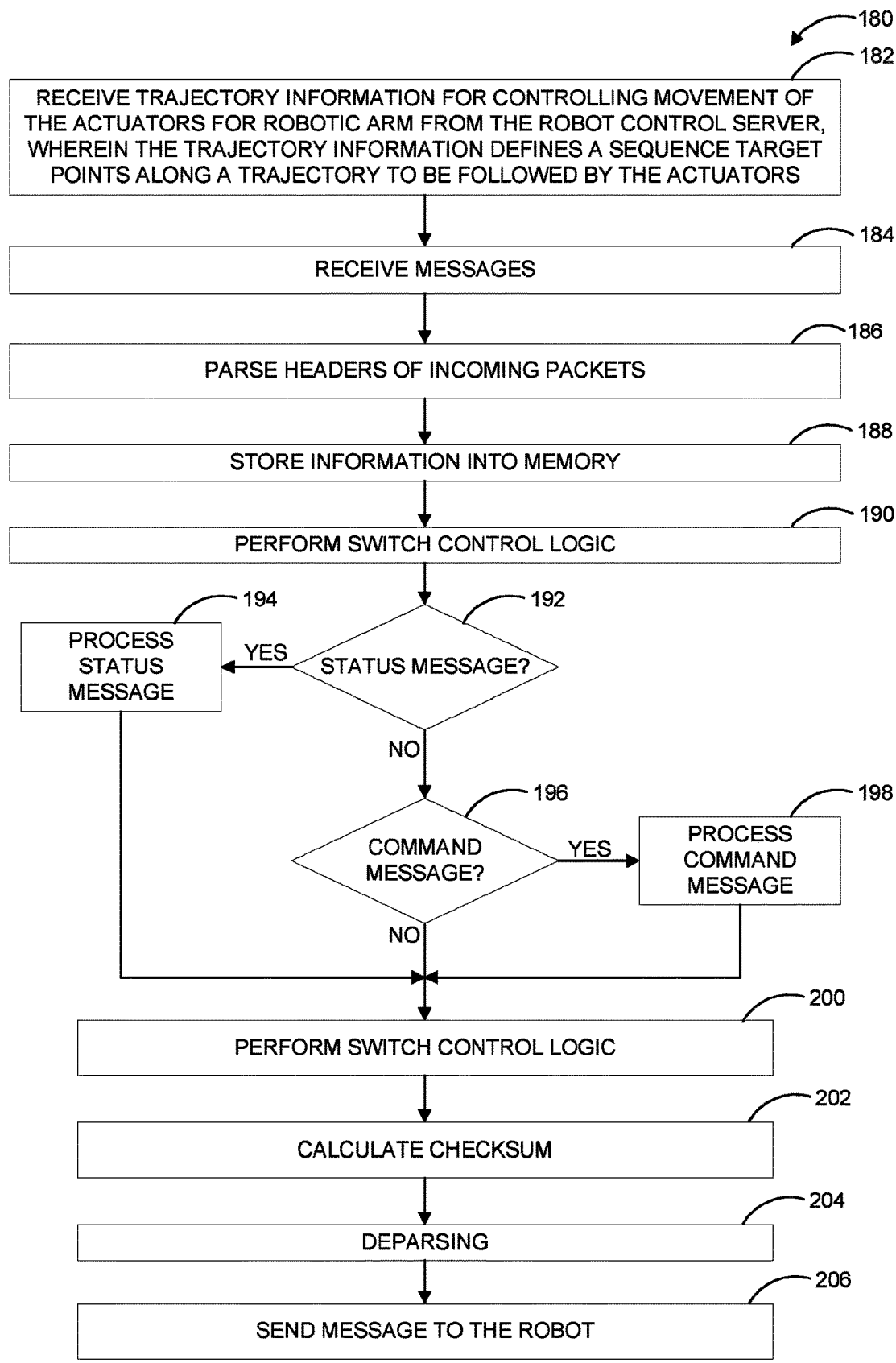
FIG. 11 is a flow diagram illustrating a method for controlling an actuator according to another embodiment of the present disclosure.

FIG. 11 is a flow diagram illustrating a method 180 for controlling one or more robotic arms 16 according to one embodiment of the present disclosure. As seen in FIG. 11, method 180 begins with packet forwarding circuit 18 receiving the trajectory information for controlling actuators 17 to move the robotic arms 16 from the robot control server 14 (box 182). Packet forwarding circuit 18 also receives messages (box 184). The messages may be status messages 22 sent by one or more of the actuators 17 of robotic arms 16, or they may be dummy command messages sent by the Dummy Command Message Generator 170. Regardless, packet forwarding circuit 18 parses the headers of the incoming packets of the messages (box 186), stores the information from the messages in its memory (box 188), and performs its conventional switch control logic (box 190).

Packet forwarding circuit 18 then determines whether the messages it received are status messages 22 (box 192). If so, packet forwarding circuit 18 processes the messages as status messages (box 194). In particular, packet forwarding circuit 18 is configured to convert the status messages 22 into command messages, as previously described. If the messages are command messages, however (box 196), packet forwarding circuit 18 processes the message as a command message (box 198). Particularly, packet forwarding circuit 18 parses the command messages received from the Dummy Command Message Generator 170, computes the new velocity vector, and updates the command header fields accordingly, as previously described. The packet forwarding circuit 18 then performs any switch control logic (box 200), re-calculates the checksum (box 202), deparses the message (box 204), and sends the command message to the appropriate actuator 17 of the appropriate robotic arm 16 (box 206).

The packet forwarding circuit 18 configured according to the present embodiments provides advantages over conventionally configured switches. For example, in addition to providing reduced latency, conventional switches, like the ones based on BAREFOOT TOFINO, have very limited instruction sets and implement a pipeline processing model with a finite number of stages. Therefore, traditional velocity control methods cannot be adapted to operate on conventional packet forwarding circuits without first undergoing extensive modification and configuration, as described herein.

Additionally, conventionally configured packet forwarding circuits have many other limitations that make adapting existing techniques for controlling the actuators of robotic arms very difficult and costly, or impossible. For example:

Conventional packet forwarding circuits do not support floating-point numbers and operations. Rather, they support only string, integers, and their corresponding operations;

Conventional packet forwarding circuits do not support division and modulo operations. In contrast, arithmetic operations on conventionally configured packet forwarding circuits are limited to addition, subtraction, and multiplication;

Conventional packet forwarding circuits do not support complex string operations. Conventional packet forwarding circuits care configured to process bit strings having a length of no more than 128 bits;

Conventional packet forwarding circuits do not support application headers in text format. Conventional packet forwarding circuits are able to support binary headers only;

Conventional packet forwarding circuits do not support a pipeline executions model. Rather, with conventional packet forwarding circuits, each packet goes through a packet processing pipeline in which each table can be applied only once, and each register (i.e., an element in a register array) can be read and written once in that order. Additionally, the number of operations and the size of generic memory in conventional packet forwarding circuits are also limited;

The tables stored in the memory of a conventional packet forwarding circuit cannot be modified from the data plane (i.e., by the packet forwarding circuit). Rather, table modifications can be performed only by the control plane. Thus, tables can be large, but they are read-only in the pipeline;

Registers (i.e., array elements) are modifiable by both data and control planes. However, both the number of accesses the switch can make, and the number of registers that can exist in the switch, are strictly limited; and Conventional packet forwarding circuits 18 do not support a transport layer protocol stack (e.g., TCP). Nor can conventional packet forwarding circuits implement such stacks due to memory constraints. Therefore, the functionality of conventional switches is largely limited to sending and receiving data packets. That is, while conventional devices process the data packets in a pipeline, they do not generally perform the functions that a traditional endpoint device would be able to perform.

Embodiments of the present disclosure, however, address such limitations and provide benefits and advantages that conventional packet forwarding circuits are not able to provide. For example:

The present embodiments offload at least some of the robot control functions to packet forwarding circuit 18. Even though switch 18 has a limited instruction set and a non-traditional execution model, offloading the functions negates the need to deploy and/or operate additional devices (e.g., PLCs). Further, a packet forwarding circuit 18 is deployed close to the robot arms, resulting in ultra-low latency;

As stated above, the limited capabilities of conventional packet forwarding circuits make the adaptation of existing, traditional solutions extremely difficult or impossible. To overcome these limitations, the present embodiments manipulate and maintain the information in the trajectory table and the velocity encoding table, and in one or more registers at the packet forwarding circuit;

Packet forwarding circuits configured according to the present disclosure perform computations in addition to their traditional data transfer functions. This leads to better utilization of the switch's computational power and a higher level of energy efficiency.

The present embodiments require minimal computational and memory overhead, and implementation of the present embodiments is not complex;

The present embodiments can be implemented in P4, and require only slight modifications in the robot control server 14 to facilitate the uploading the trajectory 30 to the packet forwarding circuit 18 rather than to the robot arm 16;

The robot control server can be disposed in a remote location (e.g., a commercial or public cloud network) where there are no strict guarantees with respect to delays and latency; and The trajectory table is specifically designed to reduce the number of interactions between data and control planes as well as the number of table lookups that are required to process the packets.

An apparatus, such as a programmable router, for example, can perform any of the methods herein described by implementing any functional means, modules, units, or circuitry. In one embodiment, for example, the apparatus comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the methods described herein, in several embodiments. In embodiments that employ memory, the memory stores program code that, when executed by the one or more processors, carries out the methods described herein.

Figure 12:
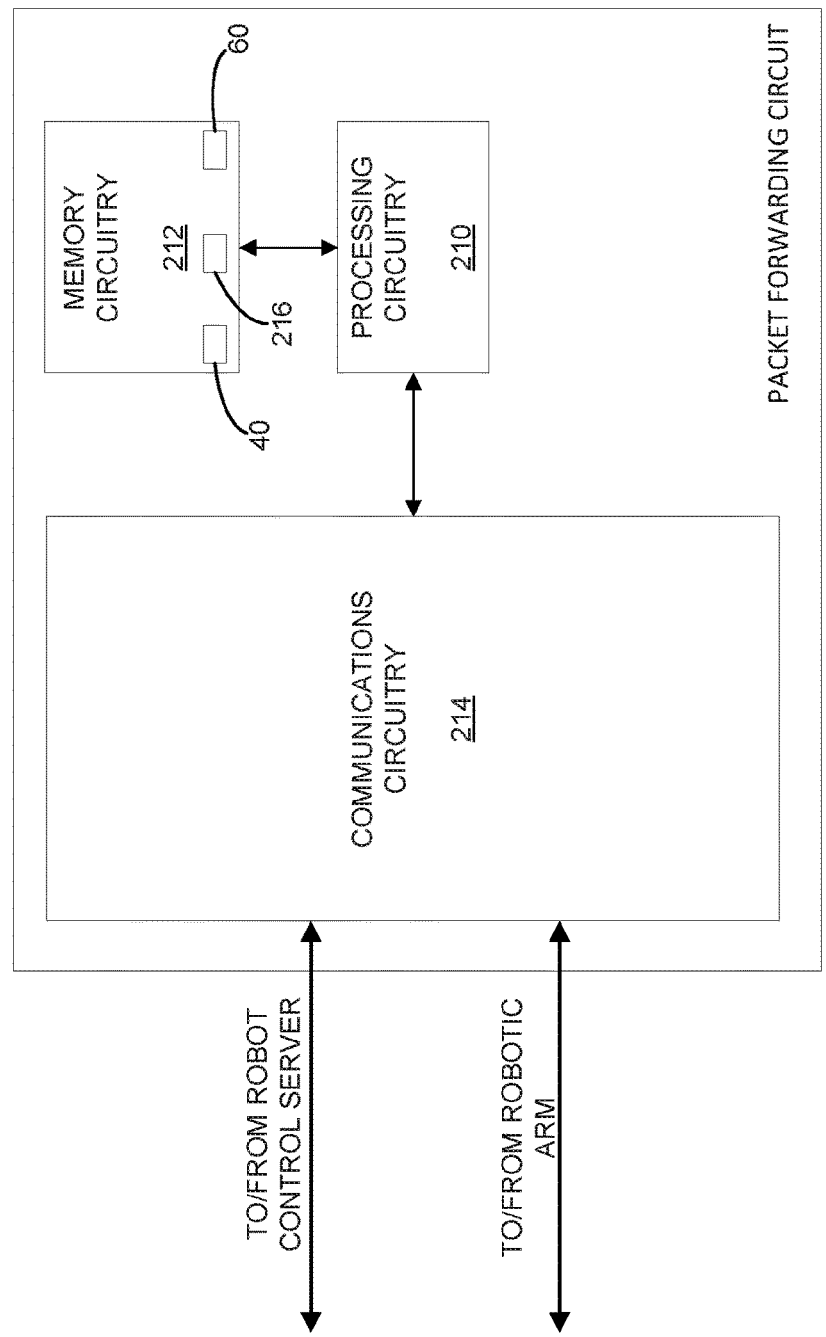
FIG. 12 is a functional block diagram illustrating a packet forwarding circuit configured according to one embodiment of the present disclosure.

FIG. 12, for example, is a block diagram of some functional components of a packet forwarding circuit 18 configured according to one embodiment of the present disclosure. As previously stated, the packet forwarding circuit may be, for example, a programmable switch or a programmable router. The packet forwarding circuit 18 can be configured to implement the procedures and methods controlling one or more actuators 17 of one or more robotic arms 16, as herein described, and comprises processing circuitry 210, memory 212, and communications circuitry 214.

The communication circuitry 214 comprises interface circuitry for communicating with other network nodes via a computer network, such as robot control server 14, as well as with one or more robotic arms 16. In particular, incoming data packets of one or more status messages 22 and/or command messages 24 are received by communication circuitry 214. Processing circuitry 210 controls the overall operation of the packet forwarding circuit 18. According to the present disclosure, processing circuitry 210 may comprise one or more microprocessors, hardware, firmware, or a combination thereof, and is configured to perform methods shown in the figures.

Memory circuitry 212 comprises both volatile and non-volatile memory for storing computer program code and data needed by the processing circuitry 210 for operation. Memory circuitry 212 may comprise any tangible, non-transitory computer-readable storage medium for storing data including electronic, magnetic, optical, electromagnetic, or semiconductor data storage. Memory circuitry 212 is configured to store both the trajectory table 40, the velocity encoding table 60, one or more registers, and a computer program 216 comprising executable instructions that configure the processing circuitry 210 to implement the methods illustrated and described herein with respect to the figures. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 216 for configuring the processing circuitry 210 as herein described may be stored in a removable memory, such as a portable compact disc, portable digital video disc, or other removable media. The computer program 106 may also be embodied in a carrier such as an electronic signal, optical signal, radio signal, or computer readable storage medium.

Figure 13:
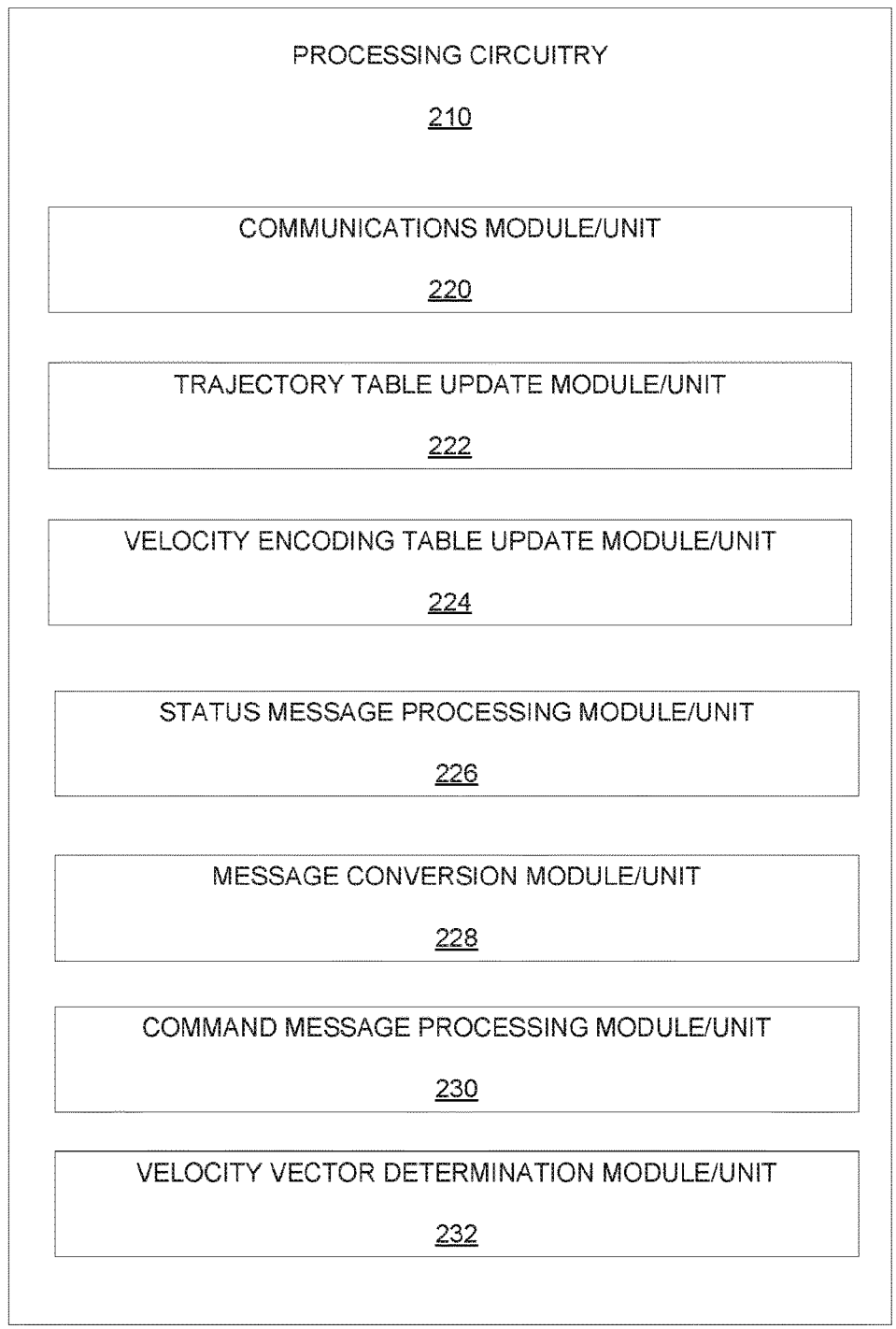
FIG. 13 is a functional block diagram of processing circuitry configured to implement embodiments of the present disclosure.

FIG. 13 illustrates a computer program product, such as computer program 216, executing on the processing circuitry 210 of packet forwarding circuit 18 according to one embodiment of the present disclosure. As seen in FIG. 13, computer program 216 comprises a communications module/unit 220, a trajectory table update module/unit 222, a status message processing module/unit 224, a message conversion module/unit 226, a command message module/unit 228, a checksum module/unit 230, and a control logic module/unit 232.

The communications module/unit 220 is configured to send and receive messages to and from other nodes in a computer network. Such nodes include, but are not limited to, the status messages 22 exchanged with robotic arm 16 and robot control server 14, and the command messages exchanged with the dummy command message generator 170 and robotic arm 16, as previously described. The trajectory table module/unit 222 is configured to update the trajectory table 40 based on information received from the robotic arm 16 and from the robot control server 14, as previously described. The velocity encoding table update module/unit 224 is configured to update and maintain the information stored in the encode velocity update table 60, as previously described. The status message processing module/unit 226 is configured to process the status messages 22 received from the robotic arm 16, as previously described. In one embodiment, for example, the status message processing update module/unit 226 communicates with the trajectory table update module/unit and/or the velocity encoding table update module/unit to update those tables as previously described. The message conversion module/unit 228 is configured to convert the status messages 22 received from robotic arm 16 into command messages 24, as previously described. To accomplish this, one embodiment of the message conversion module/unit 228 modifies the headers of the received status messages 22 before sending them back to the robotic arm 16 as command messages 24, as previously described. The command message module/unit 230 is configured to generate command messages 24 based on the dummy command messages received from the dummy command message generator 170, as previously described. The velocity vector determination module/unit is configured to determine the velocity vector for the robotic arm 16 based on information in the trajectory table 40, as previously described.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a packet forwarding circuit disposed between a control server and an actuator, for controlling the actuator, the method comprising:
receiving, from the control server, trajectory information for controlling the actuator, wherein the trajectory information defines a sequence of target points along a trajectory to be followed by the actuator;
receiving, from the actuator, a status message comprising status information about the actuator;
generating a command message to control the actuator based on the status information and the received trajectory information, wherein the status message comprises a status message header and the command message a command message header, and wherein generating the command message comprises converting the status message by:
removing the status message header from the status message;
modifying a destination address of the status message to be an address of the actuator;
adding the command message header to the command message; and
initializing the command message header; and
sending the command message to the actuator.

2. The method of claim 1 wherein the trajectory information received from the control server comprises:
all the target points in the trajectory to be followed by the actuator; or
a subset of less than all the target points in the trajectory to be followed by the actuator for a predetermined period of time; and
wherein the method further comprises storing the trajectory information received from the control server in a trajectory table in memory of the packet forwarding circuit.

3. The method of claim 1 further comprising storing an actuator state in the one or more registers at the packet forwarding circuit, wherein the actuator state defines one or both of position information and velocity information for the actuator, and wherein the one or more registers are accessible only to the packet forwarding circuit.

4. The method of claim 1 wherein generating the command message further comprises calculating a velocity vector for the actuator, wherein the velocity vector defines a velocity at which the actuator is to move a joint of a robotic arm from a first position defined by a current target point in the sequence to a second position defined by a next target point in the sequence.

5. The method of claim 4 wherein calculating the velocity vector for the actuator comprises:
determining a time duration for the actuator, wherein the time duration defines an amount of time that the actuator has to move the joint from the first position to the second position; and
initializing a set of temporary variables associated with the actuator responsive to determining that the time duration has not yet been initialized.

6. The method of claim 5 wherein calculating the velocity vector for the actuator further comprises determining whether the joint moved by the actuator has reached the first position based on a comparison of a current time to the time duration.

7. The method of claim 6 further comprising:
replacing information in the current target point in the sequence with information from the next target point in the sequence responsive to determining that the actuator has finished moving the joint to the first position; and
loading the current target point in the sequence responsive to determining that the actuator has not yet finished moving the joint to the first position.

8. The method of claim 6 further comprising updating a trajectory table at the packet forwarding circuit to include information associated with the current target point, wherein updating the trajectory table at the packet forwarding circuit comprises, responsive to determining that the actuator has finished moving a device to the first position, or that the time duration was initialized, updating the time duration of the next target point in the sequence by adding the time duration of the next target point in the sequence to the time duration of the current target point in the sequence.

9. The method of claim 8 wherein each target point in the sequence comprises a unique target id that identifies the target point, and wherein updating the trajectory table further comprises updating the target id of the next target point in the sequence at the packet forwarding circuit.

10. The method of claim 4 wherein calculating the velocity vector for the actuator comprises:
obtaining one or both of velocity information and position information from the current target point; and
calculating the velocity vector for the actuator based on the one or both of the velocity information and the position information.

11. The method of claim 4 wherein each target point defines a target id, timing information, and a sequence of one or both of velocity values and position values along a continuous trajectory curve, and wherein the method further comprises encoding the velocity vector into the command message header of the command message.

12. The method of claim 1 wherein the actuator is configured to receive a periodic control signal.

13. The method of claim 1 wherein the actuator is associated with a robotic arm and wherein the actuator is configured to:
control a motor that moves the robotic arm between two positions; and/or
control a velocity at which the robotic arm moves between two positions.

14. The method of claim 1 wherein the packet forwarding circuit is configured to control a plurality of actuators with each actuator being identified using a device id stored in a trajectory table at the packet forwarding circuit.

15. The method of claim 1 wherein the packet forwarding circuit is one of:
a programmable switch; and
a router.

16. The method of claim 1 wherein generating a command message comprises:
receiving a dummy command message from a command message generator device; and
modifying the dummy command message based on the trajectory information and the status information.

17. A packet forwarding circuit disposed between a control server and one or more actuators, the packet forwarding circuit comprising:
communications circuitry configured to communicate with both the control server and the one or more actuators; and
processing circuitry operatively connected to the communications circuitry and configured to:
receive, from the control server, trajectory information for controlling an actuator, wherein the trajectory information defines a sequence of target points along a trajectory to be followed by the actuator;
receive, from the actuator, a status message comprising status information about the actuator;
generate a command message to control the actuator based on the status information and the received trajectory information, wherein the status message comprises a status message header and the command message comprises a command message header, and
wherein to generate the command message, the processing circuitry converts the status message by:
removing the status message header from the status message;
modifying a destination address of the status message to be an address of the actuator;
adding the command message header to the command message; and
initializing the command message header; and
send the command message to the actuator.

18. A non-transitory computer-readable medium storing a computer program thereon, the computer program comprising instructions that, when executed by processing circuitry of a packet forwarding circuit disposed between a control server and one or more actuators, causes the packet forwarding circuit to:
receive, from the control server, trajectory information for controlling an actuator, wherein the trajectory information defines a sequence of target points along a trajectory to be followed by the actuator;
receive, from the actuator, a status message comprising status information about the actuator;
generate a command message to control the actuator based on the status information and the received trajectory information, wherein the status message comprises a status message header and the command message comprises a command message header, and
wherein to generate the command message, the packet forwarding circuit converts the status message by:
removing the status message header from the status message;
modifying a destination address of the status message to be an address of the actuator;
adding the command message header to the command message; and
initializing the command message header; and
send the command message to the actuator.

* * * * *